(12) United States Patent  
Harada et al.

(10) Patent No.: US 7,696,954 B2
(45) Date of Patent: Apr. 13, 2010

(54) MULTI DISPLAY DEVICE (75) Inventors: Takeshi Harada, Shizuoka (JP);
Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 891 days.

(21) Appl. No.: 11/231,741

(22) Filed: Sep. 22, 2005

(65) Prior Publication Data

US 2007/0063921 A1 Mar. 22, 2007

(51) Int. Cl.
G09G 5/00 (2006.01)
(52) U.S. Cl. .................. 345/4; 345/5; 362/23; 362/326
(58) Field of Classification Search ......... 116/284–288, 116/309; 345/1.1, 4, 5, 7, 8, 9, 76, 77, 87, 345/102, 104, 629–641, 901; 361/627; 362/23, 362/26–30, 489; 340/438, 441, 450–461, 340/691.6, 815; 725/75; 248/917; 224/483
See application file for complete search history.

(56) References Cited

U.S. PATENT DOCUMENTS

| | | | |
|---|---|---|---|
| 6,333,697 B1 * | 12/2001 | Kumazawa et al. ...... | 340/815.4 |
| 6,621,471 B1 * | 9/2003 | Ozaki et al. ..................... | 345/4 |
| 6,812,942 B2 * | 11/2004 | Ribak ........................... | 345/30 |
| 2004/0135738 A1 * | 7/2004 | Kim et al. ..................... | 345/1.1 |
| 2006/0109197 A1 * | 5/2006 | Kuwabara et al. ............. | 345/1.1 |
| 2006/0112409 A1 * | 5/2006 | Yoon ........................... | 725/75 |
| 2006/0146014 A1 * | 7/2006 | Lehtonen ..................... | 345/156 |

FOREIGN PATENT DOCUMENTS

| | | |
|---|---|---|
| DE | 42 40 465 A1 | 6/1994 |
| DE | 4240465 A1 * | 6/1994 |
| DE | 197 44 382 A1 | 4/1998 |
| JP | 2001-83913 | 3/2001 |
| WO | WO 2005005192 A1 * | 1/2005 |
| WO | WO 2006122803 A1 * | 11/2006 |

OTHER PUBLICATIONS

Bergholz et al., Multifunctional display panel, translation of DE 197 44 382 A1.*
Berholz et al., Multifunctional display panel, translation of DE 197 44 382 A1 (published on Apr. 30, 1998).*
German Office Action dated Sep. 26, 2007 with English translation.

* cited by examiner

*Primary Examiner*—Amare Mengistu
*Assistant Examiner*—Dmitriy Bolotin
(74) *Attorney, Agent, or Firm*—Kratz, Quintos & Hanson, LLP

(57) ABSTRACT

A multi display device includes: a first display disposed at a predetermined position; a second display disposed 10B in front of the first display 10A and being movable from a first position where the second display overlaps with the first display to a second position where the second display does not overlap with the first display; and a transferring member for moving the second display. When the first display is mainly monitored, the second display is transferred to the second position, and when the second display is mainly monitored, the second display is transferred to the first position.

6 Claims, 7 Drawing Sheets

MULTI DISPLAY DEVICE

The priority application claims no priority of Japanese Patent Application No. 2004-148796, which is hereby incorporated by reference.

FIELD OF THE INVENTION

The present invention relates generally to a multi display device and more particularly to the multi display device mounted on a moving object such as a vehicle, a two-wheeled vehicle, a ship, an airplane or the like, in which a plurality of displays respectively indicating various states of the moving object are integrated.

BACKGROUND OF THE INVENTION

Typically, a multi display device mounted in a cabin of a vehicle is arranged in an instrument panel in front of a driver's seat for allowing a seated driver to see respective displays through a steering wheel. Such a multi display device includes a plurality of displaying areas for a vehicle speed, an engine revolutions per minute, a fuel level in a fuel tank, temperature of engine cooling water, and the like. These display areas are arranged effectively in one case so that a driver can know a state of a vehicle at one glance.

Recently, information that a vehicle driver wants to know during driving has been varied and increased, and a number of display areas integrated into the multi display has been increased. However, since the displaying areas to be integrated are limited, various multi display devices have been suggested for displaying more information.

For example, a patent document JP-A, 2001-83913 discloses a multi display device having a main display at a back side, and a transparent display at a front side. This multi display device increases the amount of the information displayed in the display device by overlapping the displays.

However, when a large meter relative to the display, such as a speedometer or a tachometer is arranged in the multi display device described above, the meter may interfere with other meters. The overlapped meters may cause a safety problem. On the other hand, if the speedometer or the tachometer shrinks, a safety problem also may occur.

Accordingly, an object of this invention is to provide a multi display device into which a plurality of displays are effectively integrated.

SUMMARY OF THE INVENTION

In order to attain the object, according to the present invention, there is provided a multi display device including:

a first display disposed in a predetermined position;

a second display disposed in front of the first display, said second display being movable from a first position where the second display overlaps with the first display to the second position where the second display does not overlap with the first display; and a transferring member to transfer the second display to the second position when the first display is mainly monitored, and to transfer the second display to the first position when the second display is mainly monitored.

Preferably, the multi display device further includes a position selector switch with which a vehicle driver selects a position of the second display from either the first or second position, wherein the transferring member transfers the second display to the first or second position corresponding to the selector switch.

Preferably, in the multi display device, the first display displays at least either of symbols indicating various states or graphics, and the second display displays a measured value using a combination of a dial plate, graduations on the dial plate and a pointer disposed in front of the dial plate.

Preferably, the dial plate mounted on the second display includes a transparent area through which the first display is partially visible.

Preferably, the multi display device further includes a third display disposed behind the second display, wherein the second display overlaps with the third display when transferred to the second position, wherein the third display is partially visible through the transparent area of the dial plate when the second display is in the second position.

The above and other objects, features, and advantages of the present invention will be better understood when taken in connection with the accompanying drawings and description.

DESCRIPTION OF THE PREFERRED EMBODIMENTS

First Embodiment of the Present Invention

A first embodiment of a multi display device 1 according to the present invention will be described below with reference to FIGS. 1 to 9.

Figure 1A:
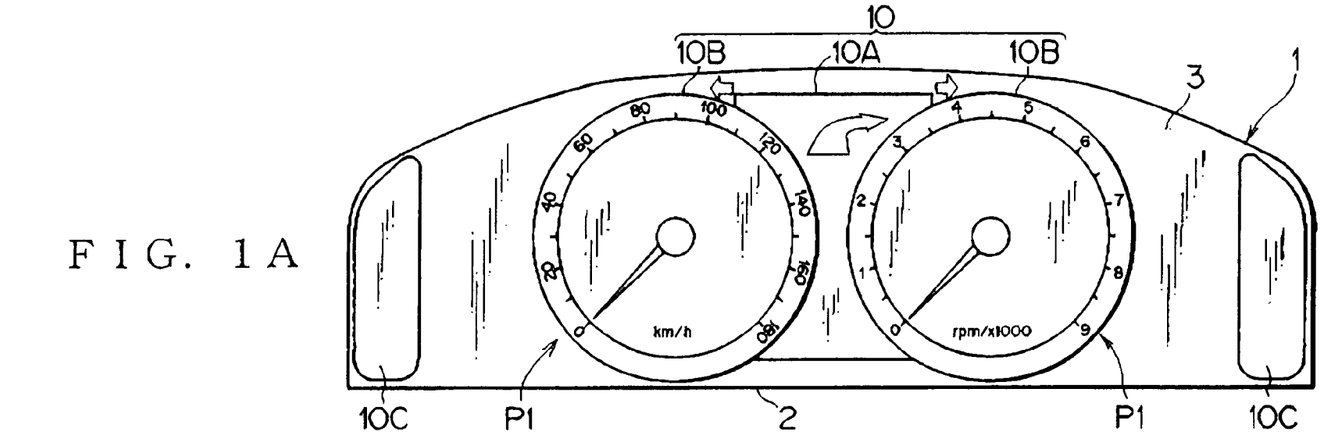
FIG. 1A is a front view showing a first embodiment of a multi display device positioned at a closed position according to the present invention.
Figure 1B:
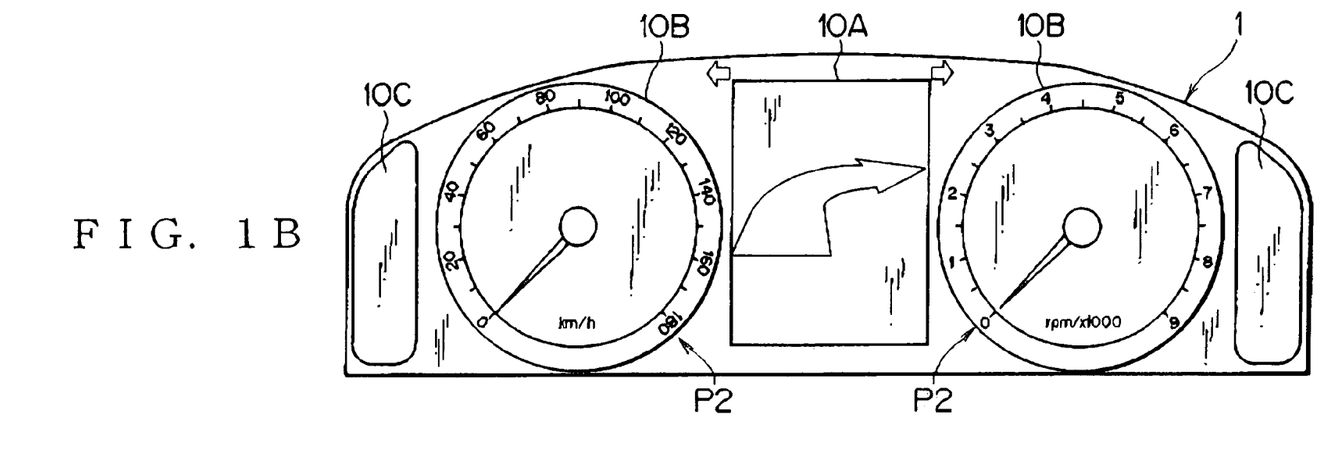
FIG. 1B is a front view showing the multi display device positioned at open positions according to the present invention.

As shown in FIG. 1, a plurality of displays 10 for displaying various states of a vehicle are integrated into a case 2 in the multi display device 1 embedded in an instrument panel of the vehicle.

The displays 10 include a first display 10A disposed in a predetermined position on a front panel 3 in the case 2, and second displays 10B disposed in front of the first display 10A and being movable from first positions P1 where the second displays 10B respectively overlap with the first display 10A to second positions P2 where the second displays 10B do not overlap with the first display.

The first display 10A is disposed in the center of the front panel 3 and displays an arrow or the like for guiding as a well-known function of a car navigation controlled by a not-shown electronic control unit (ECU). Incidentally, the first display 10A may also display an odo/trip meter, and an image of around a foreground of the vehicle.

The second displays 10B display a speedometer or a tachometer. The second displays 10B include a dial plate, graduations, the like, and a pointer disposed in front of the dial plate. The second displays display measured values as cooperation of a dial plate, graduations on the dial plate and a pointer disposed in front of the dial plate. Thus, the first display 10A and the second display 10B present different respective first and second operating information to the operator.

The displays 10 further includes third displays 10C disposed in the vicinity of both right and left ends of the front panel 3. An LCD device or the like is used for the third displays 10C for displaying such as a high beam indicator, a brake fluid level warning.

In the first embodiment, closed positions of the second displays 10B are defined as first positions P1 shown in FIG. 1A. Open positions of the second displays 10B are defined as second positions P2 shown in FIG. 1B. One third of the each second display 10B overlaps with the first display 10A at the each first position P1. None of the second displays 10B overlaps with the first display 10A or the third displays 10C at the second positions P2. However, the present invention is not limited to the above. For example, the single second display 10B may fully overlap with the first display 10A.

Figure 2:
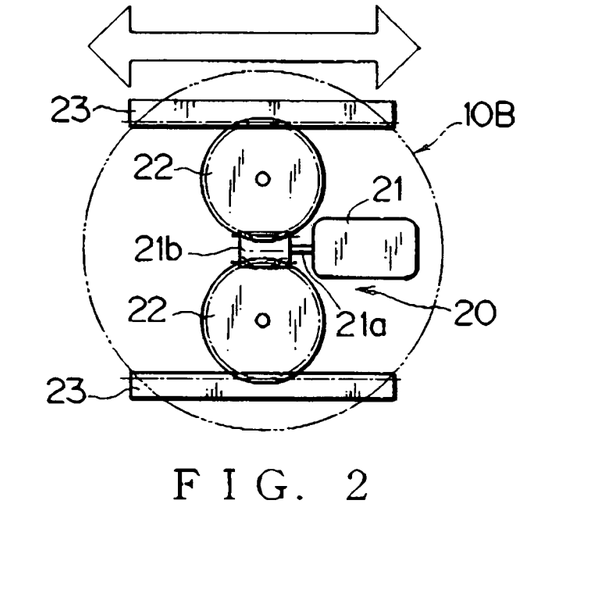
FIG. 2 is an explanatory view for explaining a moving mechanism of a second display shown in FIG. 1.

In FIG. 2, moving mechanism 20 for moving two of the second displays 10B include two motors 21, four gears 22, four racks 23. A worm gear 21b is mounted on an end of an output shaft 21a of the each motor 21. The worm gear 21b rotates together with the output shaft 21a. The two gears 22 respectively engage with the worm gear 21b. The gears 22 respectively engage with the racks 23 extending at least from the first positions P1 to the second positions P2.

According to the above, rotation of the each motor 21 transfers the racks 23 in directions shown as arrows in FIG. 2.

Figure 3:
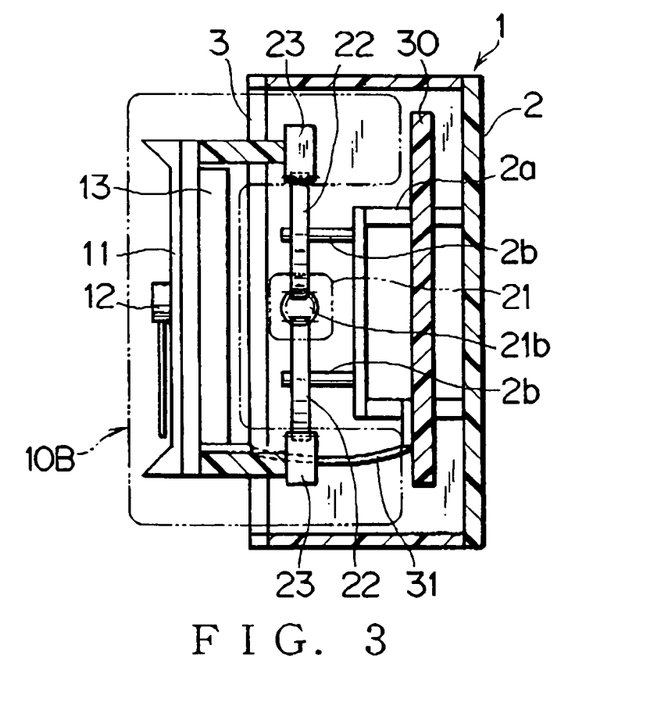
FIG. 3 is an explanatory view for explaining an assembly example of the moving mechanism shown in FIG. 2.

As shown in FIG. 3, the each motor 21 and the gears 22 of the moving mechanism 20 are mounted on the multi display device 1, and the racks 23 are respectively mounted on the second displays 10B. In an interior of the case 2, a control board 30 is fixed to a fixing member 2a projecting from an inner wall of the case 2. A control unit for controlling the moving mechanism 20 (rotation of the motor 21) and the like are mounted on the control board 30. Shafts 2b for rotatably supporting the gears 22 are mounted on the fixing member 2a. The motors 21 are mounted on a front inner wall of the case 2 at the second displays 10B side, and powered through not-shown electric wire connected to the control board 30.

Each second display 10B includes: a dial plate 11; a pointer 12 disposed in front of the dial plate 11; a pointer controller 13 having a not-shown motor disposed at a back of the dial plate 11 for rotating the pointer 12 and a not-shown motor controller; and the pair of racks 23. The racks 23 are so mounted on a housing of the second displays 10B as to respectively engage with the gears 2b mounted in the case 2 when the second displays 10B are assembled with the case 2.

After the second displays 10B are assembled with the case 2, since the racks 23 are engaged with the gears 23, the rotation of the motor 21 transfers the second displays 10B to the first position P1 or the second position P2.

Figure 4:
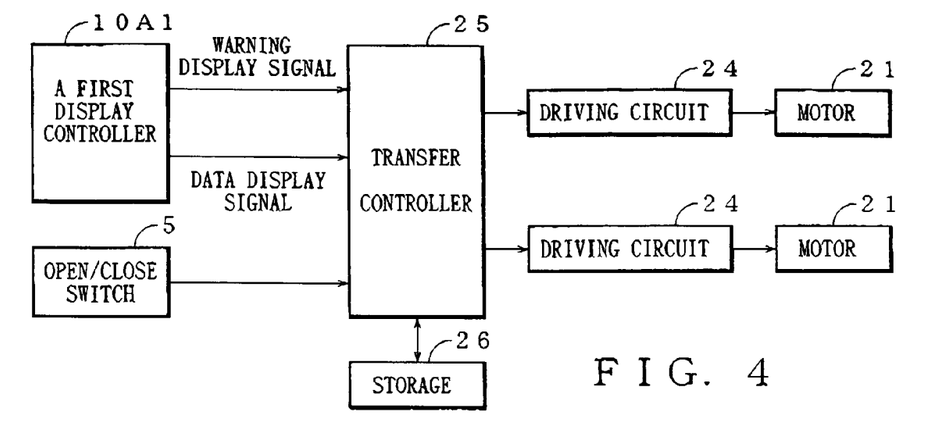
FIG. 4 is a block diagram of a transfer controller for the second display.

As shown in FIG. 4, the each motor 21 is controlled by a driving circuit 24, and the driving circuit is controlled by a transfer controller 25. A controller LSI or a DSP is used for the transfer controller 25. The transfer controller 25 is connected to a first display controller 10A1 for controlling the first display 10A. Incidentally, in this first embodiment, the transfer controller 25 controls two motors 21 respectively for two of the second displays 10B. However, various embodiments can be used, for example, two transfer controllers 25 may be used.

The first display controller 10A1 outputs a warning display signal to the transfer controller 25 before displaying a warning in a large area, and outputs a warning stop signal after stopping the display. Also, The first display controller 10A1 outputs a data display signal to the transfer controller 25 before displaying data in a large area, and outputs a data display stop signal after stopping the display.

The transfer controller 25 is connected to a selector switch 5 for selecting whether the second displays 10B are positioned at the open or the closed positions, namely, the first positions P1 or the second positions P2. The switch 5 outputs an open signal or a close signal when selected.

When any one of the warning display signal, the data display signal, or the open signal is inputted into the transfer controller 25 while the second displays 10B are in the closed positions, the transfer controller 25 controls the driving circuits 24 so as to transfer the motors 21 for moving the second displays 10B to the open positions, Next, examples of controlling processes at the closed and open positions processed by the transfer controller 25 will be explained with reference to FIGS. 5 and 6 respectively. Here, a storage 26 having such as RAM, ROM, to which the transfer controller 25 refers, stores various data including an open operation flag, warning display flag, and data display flag. These flags indicate ON/OFF states respectively.

Figure 5:
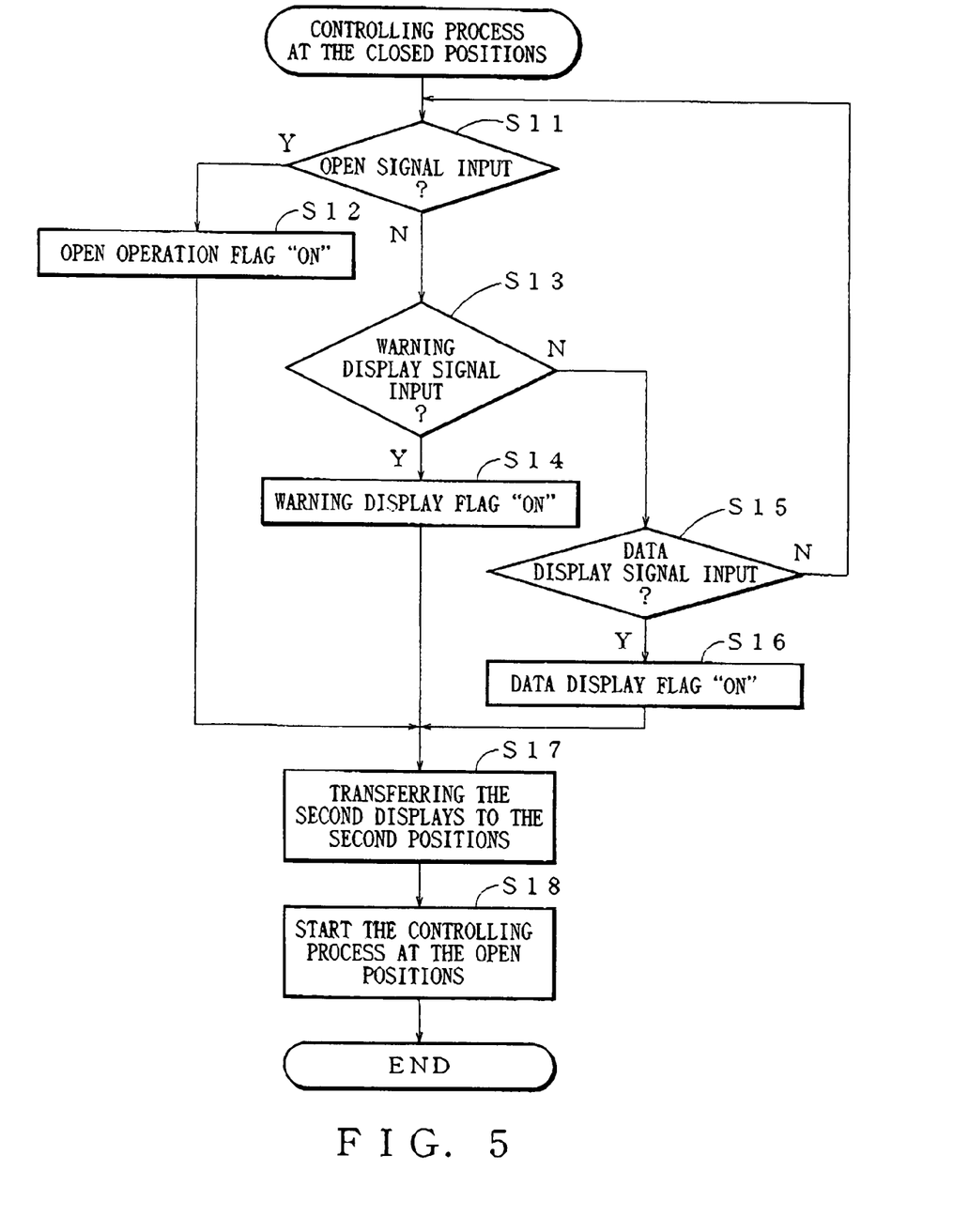
FIG. 5 is a flowchart showing an example of a controlling process at closed positions processed by the transfer controller shown in FIG. 4.

When the controlling process at the closed positions shown in FIG. 5 starts, whether the open signal is inputted from the selector switch 5 or not is judged at step S11. If judged that the open signal is inputted ("Y" at S11), "ON" is set into the open operation flag of the storage 26 at step S11, then the process goes to step S17.

If judged that the open signal is not inputted at step S11 ("N" at S11), whether the warning display signal is inputted from the first display controller 10A1 or not is judged at step S13. If judged that the warning display signal is inputted ("Y" at S13), "ON" is set into the warning display flag of the storage 26 at step S14, and then the process goes to step S17.

If judged that the warning display signal is not inputted at step S 13 ("N" at S13), whether the data display signal is inputted from the first display controller 10A1 or not is judged at step S15. If judged that the data display signal is not inputted ("N" at S15), the process returns to step S11 and repeats again. If judged that the data display is inputted at step S15 ("Y" at S15), "ON" is set into the data display flag of the storage 26, and then the process goes to step S17.

At step S17, a request for moving the second displays 10B to the open positions is outputted to the driving circuits 24. Accordingly, the motors 21 rotate to transfer the second displays 10B to the open positions. Then, at step S18, the controlling process at the open positions starts and the controlling process at the closed positions ends.

Figure 6:
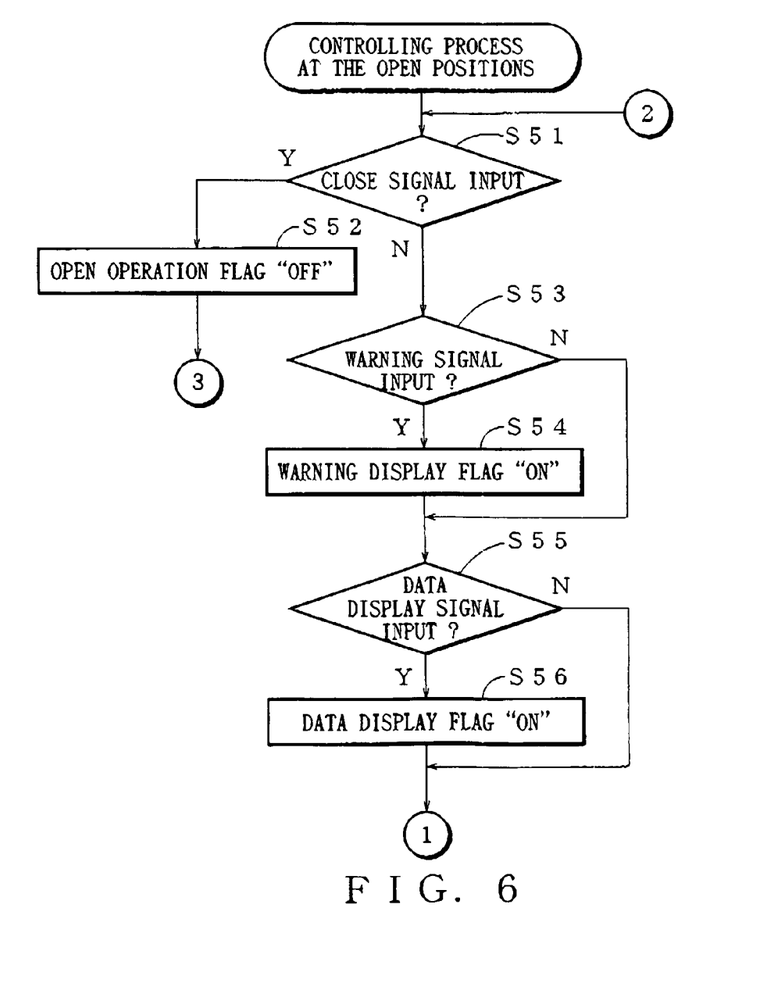
FIG. 6 is a flowchart showing an example of a controlling process at open positions processed by the transfer controller shown in FIG. 4.

When the controlling process at the open positions shown in FIG. 6 starts, whether the close signal is inputted from the selector switch 5 or not is judged at step S51. If judged that the close signal is inputted ("Y" at S51), "OFF" is set into the open operation flag of the storage 26 at step S51, then the process goes to step S64 shown in FIG. 7.

Figure 7:
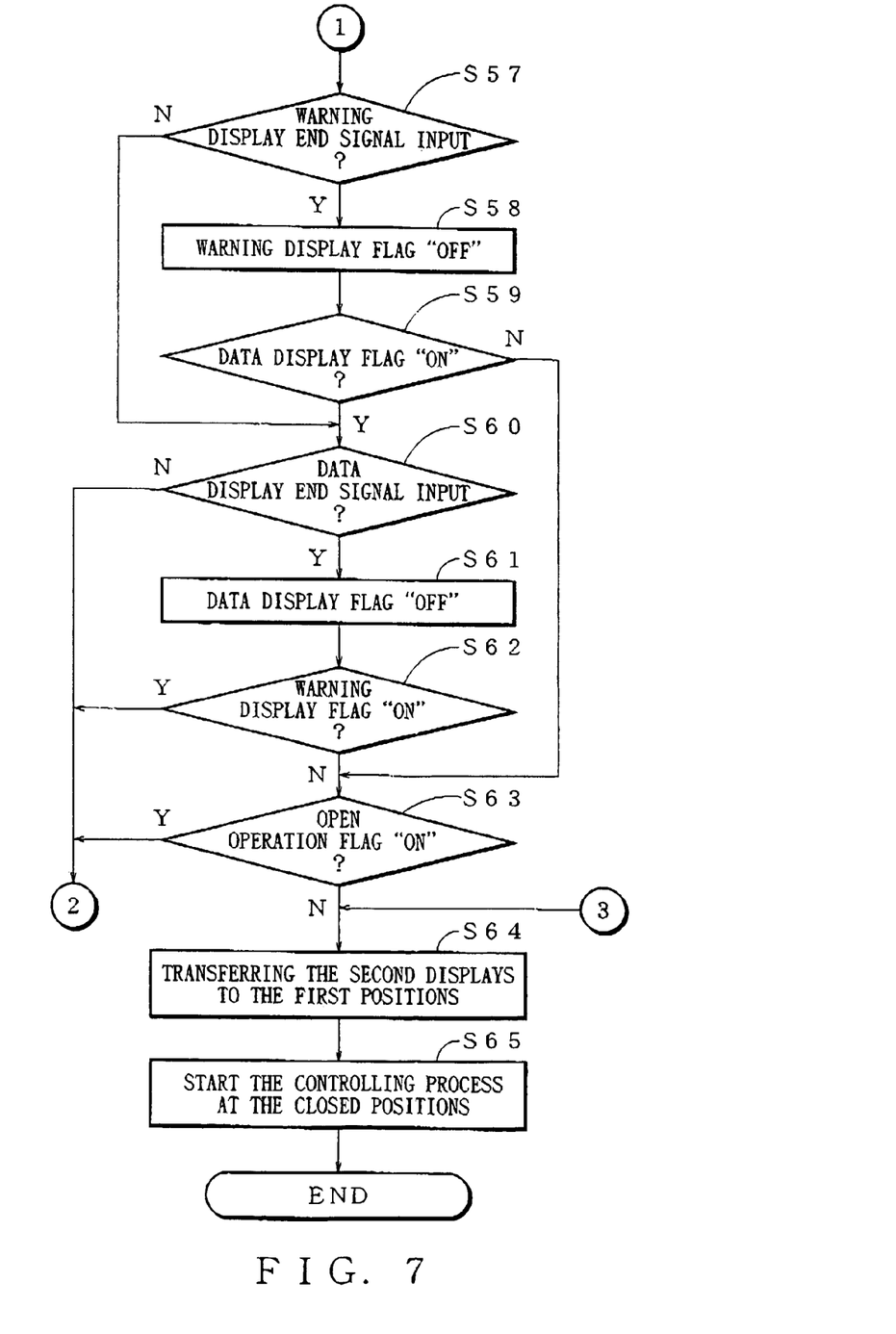
FIG. 7 is a flowchart showing another example of the control process at open positions processed by the transfer controller shown in FIG. 4.

If judged that the close signal is not inputted at step S51 ("N" at S51), whether the warning display signal is inputted from the first display controller 10A1 or not is judged at step S53. If judged that the warning display signal is not inputted ("N" at S53), the process goes to step S55. If judged that the warning display signal is inputted ("Y" at S53), "ON" is set into the warning display flag of the storage 26 at step S54, and then the process goes to step S55.

Whether the data display signal is inputted from the first display controller 10A1 or not is judged at step S55. If judged that the data display signal is not inputted ("N" at S55), the process goes to step S57 shown in FIG. 7. If judged that the data display signal is inputted ("Y" at S55), "ON" is set into the data display flag of the storage 26 at step S56, and then the process goes to step S57 shown in FIG. 7.

Whether the warning end signal is inputted from the first display controller 10A1 or not is judged at step S57. If judged that the warning end signal is not inputted ("N" at S57), the process goes to step S60. If shown in FIG. 7. If judged that the warning end signal is inputted ("Y" at S57), "ON" is set into the warning end flag of the storage 26 at step S58, and then the process goes to step S59.

Whether the data display flag of the storage 26 is "ON" or not is judged at step S59. If judged that the data display flag is not "ON" ("N" at S59), namely, the data is not displayed, the process goes to step S63. If judged that the data display flag is "ON" ("Y" at S59), namely, the data is displayed, the process goes to step 60.

Whether the data display stop signal is inputted from the first display controller 10A1 or not is judged at step S60. If judged that the data display stop signal is not inputted ("N" at S60), the process goes to step S51 shown in FIG. 6 and the controlling process at the open positions repeats. If judged that the data display end signal is inputted ("Y" at S60), "OFF" is set into the data display flag of the storage 26 at step S61, and then the process goes to step S62.

Whether the warning display flag of the storage 26 is "ON" or not is judged at step S62. If judged that the warning display flag is "ON" ("Y" at S62), namely, the warning is displayed, the process returns to step S51, and the controlling process at the open positions repeats. If judged that the warning display flag is not "ON" ("N" at S62), namely, the warning is not displayed, the process goes to step S63.

Whether the open operation flag of the storage 26 is "ON" or not is judged at step S63. If judged that the open operation flag is "ON" ("Y" at S63), namely, the second displays 10B are at the open positions, the process returns to step S51, and the controlling process at the open positions repeats. If judged that the open operation flag is not "ON" ("N" at S63), the process goes to step S64.

At step S64, a request for moving the second displays 10B to the closed positions is outputted to the driving circuits 24. Accordingly, the motors 21 rotate to transfer the second displays 10B to the closed positions. Then, at step S65, the controlling process at the closed positions starts, and the controlling process at the open positions ends.

Next, an example of an operation of the multi display device 1 as described above will be explained. When the multi display device 1 is powered by such as an ignition key of a vehicle, the second displays 10B are positioned at the closed positions (the first positions P1) as shown in FIG. 1A so that the second displays 10B positioned around the center of the case 2 are mainly monitored. At this time, the first display 10A displays a small right turn symbol indicating that a right turn corner is approaching at a display area where the second displays 10B do not overlap.

When the right corner is further approaching according to the movement of a vehicle, the third displays 10C are transferred to the open positions (the second positions P2) so that the first display 10A is mainly monitored as shown in FIG. 1B. Then, the first display 10A displays a larger right turn symbol so that a vehicle driver recognizes the right-turn at a glance.

When an emergency occurs in a vehicle while the second displays 10B are at the closed positions, the second displays 10B are transferred to the open positions as described above, and the first display 10A displays a large warning symbol, so that the driver rapidly recognizes the emergency.

When the driver selects the closed position using the selector switch 5 while the second displays 10B are at the open positions, despite of priority in the multi display device 1, the second displays 10B are transferred to the first positions P1 (the closed positions). Similarly, when the driver selects the open positions using the selector switch 5, the second displays 10B are compulsory transferred to the open positions.

According to the above, the multi display device 1 of the present invention allows the second displays 10B to overlap with the first display 10A when the second displays 10B are mainly to be monitored, and not to overlap with the first display 10A when the first display 10A is mainly to be monitored, by means of moving the second displays 10B from the first positions P1 to the second positions P2.

Accordingly, a plurality of displays are arranged effectively in the case 2 of the multi display device 1. Further, since the second displays 10B are movable according to the priority, a novel design for a display device is provided.

Further, since a driver can select main displays to see by using the selector switch 5, a commercial value of the multi display device 1 is improved.

Further, since the first display 10A displays at least either of symbols indicating various states or graphics, and each second display 10C displays a measured value as cooperation of a dial plate, graduations on the dial plate and a pointer disposed in front of the dial plate, a large display can be used as the first display 10A.

Second Embodiment of the Present Invention

Next, a second embodiment of a multi display device 1 according to the present invention will be described below with reference to FIG. 8. In order to avoid repetitions, identical numerals will be designated by identical reference numerals and only the differences existing in comparison with the first embodiment will be explained.

Figure 8A:
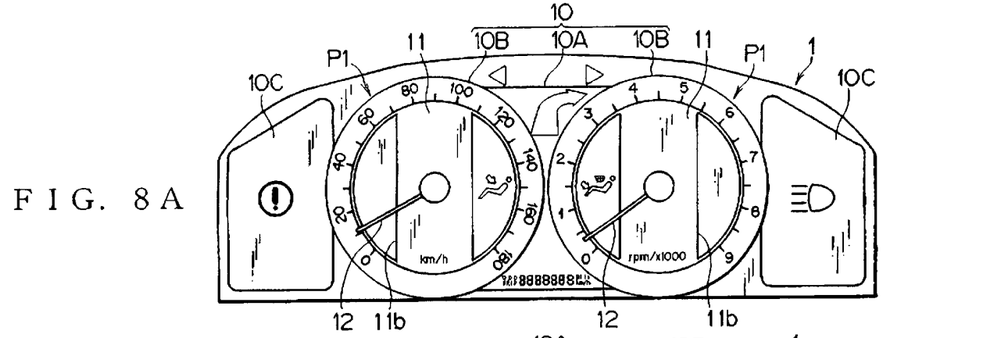
FIG. 8A is a front view showing a second embodiment of the multi display unit according to the present invention positioned at closed positions.
Figure 8B:
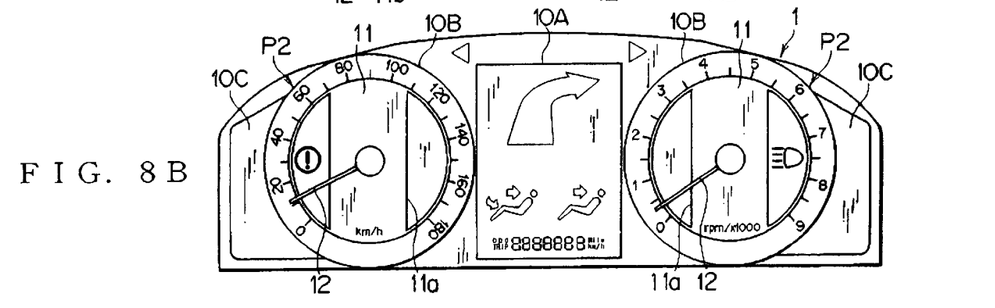
FIG. 8B is a front view showing a second embodiment of the multi display unit according to the present invention positioned at open positions.

As shown in FIG. 8, the multi display device 1 includes a first display 10A, a pair of second displays 10B, and a pair of third displays 10C. Displays used for the third displays 10C are larger than those in the first embodiment for displaying larger information. Accordingly, when the second displays 10B are at the second positions P2, the second displays 10B partially overlaps with the third displays 10C.

A transparent area 11a is formed on a dial plate 11 of each second display 10B for allowing the first display 10A to be monitored partially through the second display 10B when the second displays 10B are in first positions P1. This transparent area 11a is formed as a substantially semicircular opening along the graduations or the like formed on the dial plate 11. As shown in FIG. 8A, when the second displays 10B are in the first positions P1, the first display 10A displays symbols indicating directions of air from an air conditioner at areas corresponding to the transparent areas 10a. In addition, the first display 10A also displays odo and trip meters below the areas.

Then, as shown in FIG. 8B, for displaying a right-turn symbol larger, the second displays 10B are transferred to the second positions P2, and the first display 10A changes the sizes and positions of the symbol indicating the directions of air with a larger right-turn symbol. Thus, corresponding to the positions of the second displays 10B, the first display 10A changes the sizes and positions of the symbols to improve visibility and space use efficiency.

The dial plate 11 of each second display 10B also includes a second transparent area 11b for allowing the third displays 10C to be monitored through the second displays 10B when the second displays 10B are in the second positions P2. The second transparent area 11b is also formed as a substantially semicircular opening like the transparent area 11a. As shown in FIG. 8B, the third displays 10C respectively show a brake symbol and a high beam symbol on areas corresponding to the second transparent areas 11b when the second displays 10B are positioned in the second positions P2.

Further, when the second displays 10B are transferred to the first positions P1, the third displays 10C display larger brake and high-beam symbols in the centers of the third displays 10C. Thus, the third displays 10C also change the positions and sizes of the symbols corresponding to the positions of the second displays 10B to increase the visibility.

Further, since the transparent area 11a and the second transparent area 11b are opening, driving member of each pointer 12 is arranged so as not to be monitored through the transparent areas 11a, 11b at a backside of the dial plate 11. Incidentally, the transparent areas 11a, 11b are opening in the second embodiment, however, various forms can be used. For example, the dial plate 11 may be made of transparent material and areas except the transparent areas 11a, 11b may be covered by opaque material or printed.

As described above, owing to the transparent areas 11a, 11b, the displays 10A, 10B, 10C of the multi display device 1 are used effectively, and the space use efficiency is improved.

Since the displays 10A, 10C can be partially monitored through the transparent areas of the displays 10C when the third displays 10C overlap with them, a larger display can be used for the first display 10A and third displays 10C.

Incidentally, in the second embodiment, two pairs of the transparent areas 10a, 10b are used, however, a number or sizes of the transparent areas are not limited. Either one of the transparent area 11a or the second transparent area 11b may be used.

Figure 9:
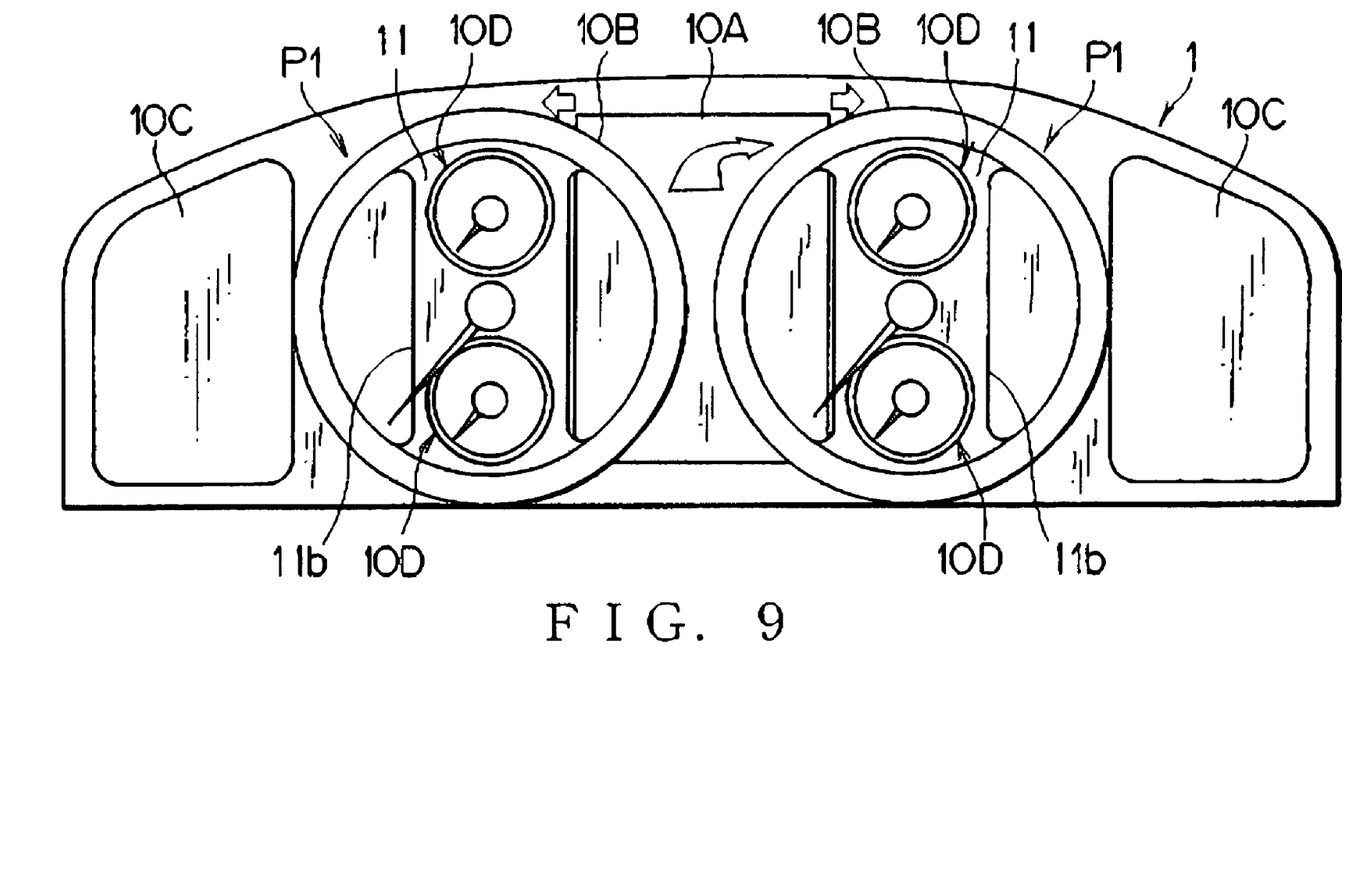
FIG. 9 is a front view showing an improved embodiment of the multi display unit shown in FIG. 8.

Next, an improved embodiment of the multi display unit shown in FIG. 8 (second embodiment) will be explained with reference to FIG. 9. As shown in FIG. 9, a pair of fourth pointer type displays is embedded in the dial plate 11 of each second display 10B. Thus, even when a number of displays increases, the visibility of the first display 10A does not decrease. Since the multi display device 1 of the improved embodiment has large and small meters like a chronograph alarm watch, novel design is provided.

Incidentally, in the embodiments described above, the first display 10A and the third displays 10C display graphic symbols and the second displays 10B display pointer-type meters. However, various combinations can be employed within the scope of the present invention.

Further, in the embodiments described above, as shown in a flowchart of FIG. 6, when the driver selects the closed positions using the selector switch 5 while the warning or the data is displayed on the first display 10A ("Y" at step S51), the open operation flag turns "OFF" and the second displays 10B are transferred to the first positions P1.

However, in this case, the warning or the data displayed on the first display 10A partially becomes hard to be monitored because the second displays 10B overlap with the first display 10A. Therefore, when the second displays 10B is transferred to the first positions P1, the controlling process may instruct the first display controller 10A1 shown in FIG. 4 to change the symbols on the first display 10A into smaller symbols for keeping the visibility. Specifically, a new step for changing the symbols of the first display 10A may be added next to the step S52 in FIG. 6.

Having now fully described the present invention, it will be apparent to one of ordinary skill in the art that many changes and modifications can be made thereto without departing from the scope of the invention as set forth herein.

What is claimed is:

1. A multi display device for a vehicle comprising:
   a first display, presenting first operating information to an operator, disposed in a predetermined position;
   a second display, presenting second operating information to the operator, disposed in front of the first display, said second display being movable to selectively cover and uncover a surface portion of the first display; and
   a transferring member to move the second display over the surface of the first display;
   wherein said first display displays at least either of symbols indicating various states or graphics, and said second display displays a measured value using a combination of a dial plate, graduations on the dial plate and a pointer disposed in front of the dial plate;
   further comprising a third display disposed behind the second display, wherein the second display overlaps with the third display when transferred to a second position, wherein the third display is partially visible through a transparent area of the dial plate when the second display is in the second position.

2. The multi display device as claimed in claim 1, wherein said dial plate mounted on the second display includes a transparent area through which the first display is partially visible.

3. A multi display (1) for a vehicle, comprising:
   a first display device (10A) having a display panel for displaying symbols;
   two second display devices (10B), each of which comprising a pointer (12) and a circular dial plate (11) having graduations and a transparent area (11a) formed along the graduations in form of a segment of circle, the second display devices (10B) being disposed parallel in front of the first display device (10B) so that the first display device (10A) is visible at least partly between the second display devices (10B),
   wherein the transparent areas (11a) are faced to each other, so that, when said second display devices (10B) are in a first position (P1), the dial plates (11) of the second display devices (10B) overlap partly with the display panel of the first display device (10A) such that the transparent areas (11a) are disposed in-front of the first display device (10A), and
   wherein the second display devices (10B) are movable away of each other from the first position (P1) to a second position (P2) in which the first display device (10A) is uncovered from the second display device;
   a display controller (10A1) for controlling the first display device (10A) such that, when the second display devices (10B) are in the first display device (10A) such that, when the second display devices (10B) are in the first position (P1), symbols are displayed on the display panel of the first display device (10A) in a smaller version in an area that is uncovered by the second display devices (10B) and are displayed in an area that is arranged behind the circle-segment formed transparent areas (11a), and that the symbols are displayed on the display panel of the first display device (10A) in a bigger version and with changed positions, when the second display devices (10B) are in the second position (P2); and a transferring device (20) to transfer the second display devices (10B) from the first position (P1) to the second position (P2) in response to a warning display signal or a data display signal and to transfer the second display device from the second position (P2) to the first position (P1) in response to a warning display stop signal or a data display stop signal.

4. The multi display device (1) as claimed in claim 3, wherein on each of two sides of the first display device (10) a third display device (10C) is disposed, which is adjacent to one of the second display devices (10B), each of the second display devices (10B) comprising an additional transparent area (11b) which has the form of a segment of circle and is formed alongside the graduations, wherein the additional transparent areas (11b) are disposed on the second display devices (10B) facing away from each other so that, when the second display devices (10B) are in the second position, the dial plates (11) of each of the second display devices (10B) partly overlap the display panel of the respective adjacent third display device (10C) such that the respective additional transparent area (11b) is disposed in front of the display panel of these third display device (10C); and wherein symbols are displayed on the third display devices (10C) in a smaller or bigger version according to a display control which is analogous to the display control of the second display devices (10B).

5. The multi display device (1) as claimed in claim 3, further comprising:

a position selector switch with which a vehicle driver selects a position of the second display devices (10B) from the first and the second position (P2), wherein said transferring device (20) transfers the second display device to the first or second position (P2) corresponding to the selector switch, despite of a priority given due to the signals from the display controller (10A1).

6. The multi display device (1) as claimed in claim 5, wherein on each of two sides of the first display device (10) a third display device (10C) is disposed, which is adjacent to one of the second display devices (10B), each of the second display devices (10B) comprising an additional transparent area (11b) which has the form of a segment of circle and is formed alongside the graduations, wherein the additional transparent areas (11b) are disposed on the second display devices (10B) facing away from each other so that, when the second display devices (10B) are in the second position, the dial plates (11) of each of the second display devices (10B) partly overlap the display panel of the respective adjacent third display device (10C) such that the respective additional transparent area (11b) is disposed in front of the display panel of these third display device (10C); and wherein symbols are displayed on the third display devices (10C) in a smaller or bigger version according to a display control which is analogous to the display control of the second display devices (10B).

\* \* \* \* \*